(12) United States Patent
Sato et al.

(10) Patent No.: US 7,412,146 B2
(45) Date of Patent: Aug. 12, 2008

(54) SPLICE PROTECTION HEATER, FUSION SPLICER INCLUDING THE SPLICE PROTECTION HEATER, AND FUSION SPLICING METHOD

(75) Inventors: Ryuichiro Sato, Yokohama (JP); Kensuke Ito, Yokohama (JP); Tsutomu Watanabe, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 90 days.

(21) Appl. No.: 11/447,312

(22) Filed: Jun. 6, 2006

(65) Prior Publication Data
US 2006/0280417 A1 Dec. 14, 2006

(30) Foreign Application Priority Data
Jun. 9, 2005 (JP) ............................. 2005-168965
Jul. 11, 2005 (JP) ............................. 2005-201446

(51) Int. Cl.
*G02B 6/255* (2006.01)
(52) U.S. Cl. ...................................... 385/134; 385/95
(58) Field of Classification Search ...................... None
See application file for complete search history.

(56) References Cited

U.S. PATENT DOCUMENTS

| | | | |
|---|---|---|---|
| 4,509,820 A * | 4/1985 | Murata et al. | 385/99 |
| 5,046,813 A | 9/1991 | Itoh et al. | |
| 5,533,160 A * | 7/1996 | Watanabe et al. | 385/96 |
| 6,099,170 A * | 8/2000 | Sarbell | 385/99 |
| 6,499,891 B1 * | 12/2002 | Stevenson | 385/99 |
| 6,814,124 B2 * | 11/2004 | Esmaeili | 156/502 |
| 7,040,818 B2 * | 5/2006 | Sato | 385/99 |
| 2004/0218878 A1 * | 11/2004 | Takahashi et al. | 385/99 |
| 2004/0247261 A1 * | 12/2004 | Sato | 385/99 |
| 2004/0258370 A1 * | 12/2004 | Bush et al. | 385/97 |
| 2005/0123253 A1 * | 6/2005 | Sato | 385/99 |

FOREIGN PATENT DOCUMENTS

| | | |
|---|---|---|
| JP | 02-072305 | 3/1990 |
| JP | 072305 | 3/1990 |
| JP | 04-53601 | 12/1992 |
| JP | 09-297243 | 11/1997 |
| JP | 2001-013355 | 1/2001 |
| JP | 2005-024921 | 1/2005 |
| JP | 2005-321644 | 11/2005 |
| RU | 2 046 383 C1 | 10/1995 |
| RU | 2 181 496 C2 | 4/2002 |
| WO | WO 98/08125 | 2/1998 |
| WO | WO-2006/132182 | 12/2006 |

* cited by examiner

*Primary Examiner*—Sung H Pak
(74) *Attorney, Agent, or Firm*—Global IP Counselors, LLP

(57) ABSTRACT

A splice protection heater capable of quickly and efficiently performing a fusion process without an excessive heating time, a fusion splicer including the splice protection heater, and a fusion splicing method are provided. The apparatus has a heating part for heat shrinking a protection sleeve that covers a fusion spliced portion of an optical fiber, a plurality of heating elements that can individually heat a plurality of protection sleeves with different timings by being individually turned ON/OFF by switches, or a heating element turned ON/OFF by a switch. This apparatus may also be provided with detecting section that detects whether or not the protection sleeve is set on the heating element, and turns the switch ON/OFF.

15 Claims, 13 Drawing Sheets

SPLICE PROTECTION HEATER, FUSION SPLICER INCLUDING THE SPLICE PROTECTION HEATER, AND FUSION SPLICING METHOD

BACKGROUND OF THE INVENTION

1. Field of the Invention

The present invention relates to a splice protection heater for protecting a fusion spliced portion of an optical fiber by heat shrinking a protection sleeve covering the fusion spliced portion, a fusion splicer including the splice protection heater, and a fusion splicing method.

2. Description of the Background Arts

Fusion splicing of optical fibers is performed by heating and fusing abutting end portions of glass fibers that have been exposed by removing protective coatings on splicing ends of the optical fibers. Since a part of the fusion spliced optical fiber where the glass fiber has been exposed is mechanically weak, it is necessary to protect the part with a protection sleeve. The protection sleeve is usually configured by accommodating hot-melt adhesive resin and a tensile body (also referred to as a reinforcing rod) within a heat shrinkable tube that shrinks in the radial direction when heat is applied thereto (for example, refer to Japanese Patent Application Laid-Open No. 09-297243).

In general, when protecting a fusion spliced optical fiber, the fusion-spliced portion of the optical fiber is disposed in a housing part of a splice protection heater with a protective sleeve covering the portion. Next, the heating element is switched ON, and then later switched OFF after heating the protection sleeve for a predetermined time, whereupon the fusion-spliced portion is removed from the splice protection heater. The switch of the heating element is configured to be ON with a timing determined by an operator regardless of whether or not the fusion-spliced portion is in the splice protection heater.

However, a loss of time may be incurred, for example, if an operator forgets to turn the switch ON after having disposed a fusion-spliced portion in the splice protection heater. Furthermore, a fusion-spliced portion may be broken or damaged if an operator removes the unprotected optical fiber from the splice protection heater after a fixed time without becoming aware that he has not turned the switch ON. Moreover, a proper protection process may not be performed because of an insufficient actual heating time if the switch is turned ON before a fusion-spliced portion is disposed in the housing part of the splice protection heater. An operator may forget to manually switch the heating element ON or OFF regardless of the care taken and an ON/OFF timing of the switch may not be uniform.

Furthermore, batch fusion splicing of a plurality of optical fibers and batch protection processing of the plurality of optical fibers are known (for example, refer to Japanese Patent Application Laid-Open No. 02-72305). In this case, although respective fusion spliced portions are disposed in separate channels provided on the heating platform of the splice protection heater, the heating element is turned ON with a switch to thermally protect the plurality of fusion-spliced portions in a batch. This arrangement cannot be applied, therefore, if different types of protection sleeves that require different heating times for processing are used. In addition, once the switch of the heating element is turned ON, protection sleeves cannot be added until the thermal protection process ends.

In a general fusion splicing process, time required for the splicing operation is 10~20 seconds, and time required for the protection operation is 40~135 seconds. Therefore, even though the splicing operation is performed quickly, the thermal protection operation to the following fusion spliced fiber cannot be started and an idle time in a standby state is caused until the protection process of the preceding fusion spliced fiber has been completed. Although splicing operation can be performed parallel to the protection operation, the fusion-spliced portion as itself that has not yet been protected is extremely weak. Therefore, a situation where many fusion-spliced optical fibers waiting protection processing are accumulated may cause problems in which a fusion-spliced portion is broken, damaged or the like by an external force.

SUMMARY OF THE INVENTION

An object of the present invention is to provide a splice protection heater capable of efficiently performing a thermal protection process without causing idle time between splicing operation and the following protection operation, and further capable of performing a thermal protection process suitable for each protection sleeve, a fusion splicer including the splice protection heater, and a fusion splicing method. A further object of the present invention is to provide a splice protection heater capable of quickly and efficiently performing a thermal protection process with just sufficient heating time for the protection operation and capable of preventing human error in the ON/OFF operations of a switch for a heating element, a fusion splicer including the splice protection heater, and a fusion splicing method.

These objects are attained by providing a splice protection heater comprising a heating part for heat shrinking at least one protection sleeve covering a fusion spliced portion of at least one optical fiber, the heading part having a plurality of heating elements separated by at least one heat-shielding member and capable of individually heating the at least one protection sleeve with different timings by being individually turned ON/OFF by switches, a heater cover that is openable and closable around a heat generating portion of the heating elements, and a clampers for gripping the at least one optical fiber at both ends of the heating elements, and a fusion splicer provided with this splice protection heater. The heater cover may include a plurality of cover sections individually openable and closable around corresponding one of the heating elements. Each of the clampers may include a plurality of clamper sections for individually gripping the at least one optical fiber disposed on the corresponding heating element and each of the clamper sections may be provided with a tension exerting mechanism capable of individually exerting a tension force on the at least one fiber.

Additionally provided is an optical fiber fusion splicing method comprising fusion splicing at least first and second optical fibers, covering fusion spliced portions of the first and second optical fibers with first and second protection sleeves, respectively, turning on a first heating element of a splice protection heater at a first timing to start heat shrinking of the first protection sleeve, and turning on a second heating element of the splice protection heater at a second timing to start heat shrinking of the second protection sleeve.

Another aspect provides a splice protection heater including a heating part for heat shrinking a protection sleeve covering a fusion spliced portion of an optical fiber, having a heating element that is turned ON/OFF by a switch, a heater cover that is openable and closable around a heat generating portion of the heating element, and clampers for gripping optical fiber at bilateral ends of a heating element, and a detecting section that detects whether or not a protection sleeve is on the heating element, and for turning the switch ON/OFF, and a fusion splicer provided with the splice protection heater. The detecting section may be, for example, a sensor that optically or magnetically detects whether an protective sleeve is placed on the heating element, a sensor that optically or magnetically detects the operation of the heater cover, or a micro switch that mechanically detects the operation of the heater cover, a sensor that optically or magnetically detects the operation of at least one of the clampers, or a micro switch that mechanically detects the operation of at least one of the clampers, or a micro switch that optically or mechanically detects whether an optical fiber is placed on the splice protection heater.

Additionally provided is an optical fiber fusion splicing method including fusion splicing an optical fiber, covering a fusion-spliced portion of the optical fiber with a protection sleeve, detecting whether the protection sleeve is placed on a heating element of a splice protection heater, and automatically turning ON a switch of the heating element of the splice protection heater upon detection of the protection sleeve being placed on a heating element to start heat shrinking the protection sleeve.

BRIEF DESCRIPTION OF THE DRAWINGS

These and other features, aspects, and advantages of the present invention will be better understood through the following description, appended claims, and accompanying drawings, in the explanation of the drawings, an identical mark is applied to identical elements and an overlapping explanation will be omitted.

FIG. 10A illustrates a view on a plane taken in a direction substantially perpendicular to the optical fiber and FIG. 10B illustrates a view on a plane taken in a direction substantially parallel to the optical fiber;

DETAILED DESCRIPTION OF THE INVENTION

Figure 1:
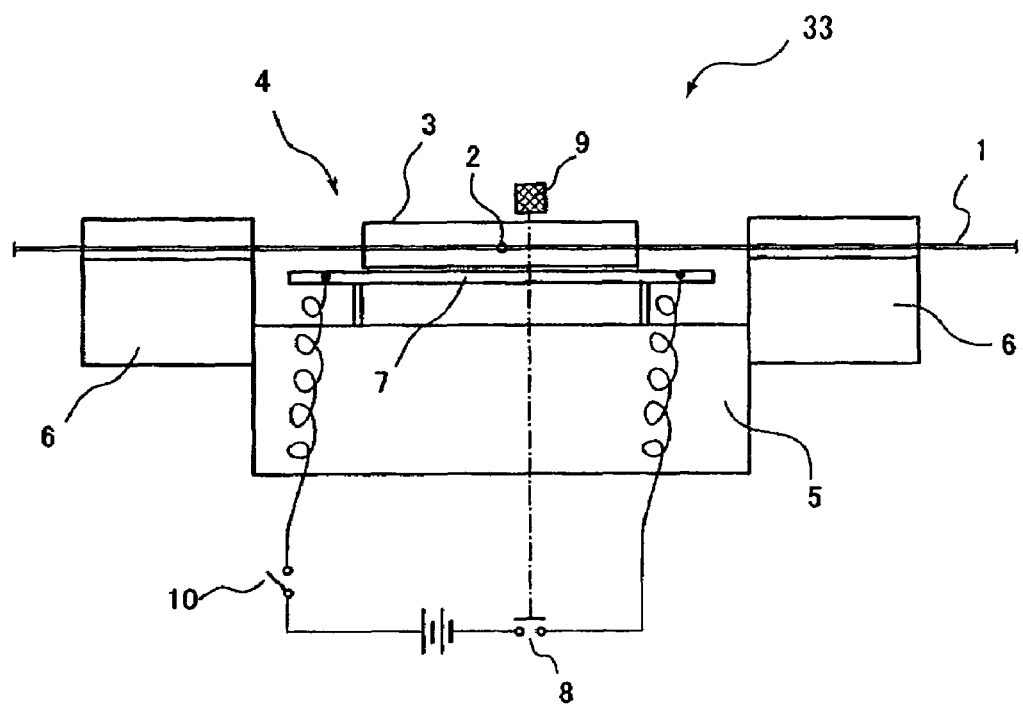
FIG. 1 is a schematic drawing showing a splice protection heater according to a first embodiment of the present invention.

FIG. 1 is a schematic drawing showing of a splice protection heater according to a first embodiment of the present invention. The splice protection heater 33 performs a thermal protection process with a heating part 4 on an optical fiber 1 (single fiber or optical fiber ribbon) at a fusion spliced portion 2 covered with a protection sleeve. The heating part 4 is provided with a pair of clampers 6 disposed at bilateral ends of a base 5, and a heating element 7 that is disposed at a center portion of the heating part. The heating part 4 supports a fusion-spliced optical fiber without slack by the left and right clampers 6.

After the fusion-spliced portion 2 that is covered with the protection sleeve 3 has been placed on the heating element 7, the heating part 4 is enclosed by a heater cover (not shown in FIG. 1). Then, a switch 8 is turned ON to provide current to the heating element 7 and to heat shrink the protection sleeve 3. When heating process for the protection sleeve 3 ends after heating has been proceeded for a predetermined time, the switch 8 is turned OFF. Another power supply switch 10 may be provided to supply current to the heating element 7. The protection sleeve 3 houses within the heat shrink tube a hot-melt member formed of hot-melt adhesive resin or the like, and a reinforcing rod, such as a stainless rod, magnetic rod, glass ceramic rod or the like. The protection sleeve 3 is attached on one side of the optical fiber 1 in advance, and is moved so as to cover the fusion-spliced portion 2 after fusion splicing.

The splice protection heater of the first embodiment is configured such that the switch 8 of the heating element 7 is turned ON and OFF automatically when a detecting section 9 detects that a fusion spliced portion covered with a protection sleeve 3 has been set or removed from the heating element of the splice protection heater. The splice protection heater of the first embodiment can prevent a mistake caused by forgetting to turn the switch ON or OFF.

Figure 2:
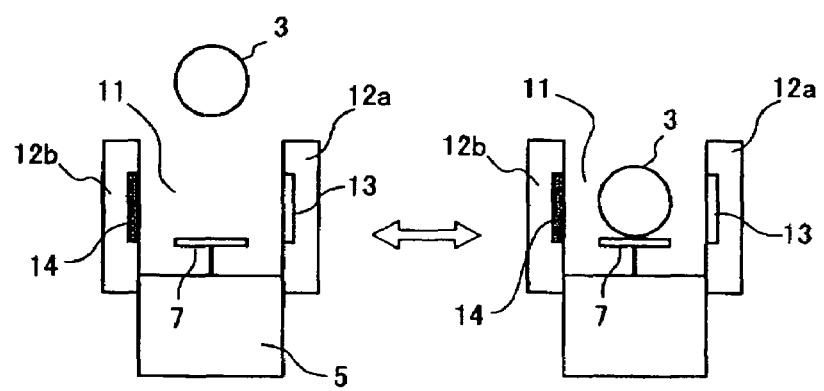
FIG. 2 is a schematic drawing illustrating a detecting section that optically detects a fusion-spliced portion within the splice protection heater.

FIG. 2 is a schematic diagram illustrating the detecting section optically detecting the fusion-spliced portion within the splice protection heater. In this example, a light-emitting element 13, such as a light-emitting diode or the like, is disposed at a side wall 12a of a housing 11 accommodating the protection sleeve 3, and a photoreceptor element 14, such as a photodiode or the like, is disposed at a side wall 12b on the opposite side to detect the placement and removal of the fusion spliced portion 2. When the fusion-spliced portion 2 is set within the splice protection heater, the light from the light-emitting element 13 to the photoreceptor element 14 is blocked, and the placement of the fusion-spliced portion 2 is optically detected in a contactless detection. Then, the switch of the heating element 7 is automatically turned ON to start the current flow. The switch of the heating element 7 is automatically turned OFF to stop the current flow when the fusion-spliced portion 2 is removed from the housing 11. A timer may be simultaneously used to turn OFF the switch to accurately measure the heating time. This method can be expected to provide safe and accurate control since the presence/absence of the fusion-spliced portion 2 itself is directly detected.

In the structure shown in FIG. 2, the light-emitting element and the photoreceptor element may be replaced by an embedded magnetic sensor while a magnetic rod detectable by a magnetic sensor is used as the reinforcing rod of the protection sleeve 3. For example, a magnetic resistance element, a Hall effect element, a lead switch, and the like may be used as the magnetic sensor. In this case, too, the switch of the heating element 7 is automatically turned ON to allow current to flow by placement of the fusion-spliced portion 2. The switch of the heating element 7 is automatically turned OFF when the fusion-spliced portion 2 is removed from the housing 11. A timer may also be used as described above to turn OFF the switch so as to accurately measure the heating time.

Figure 3:
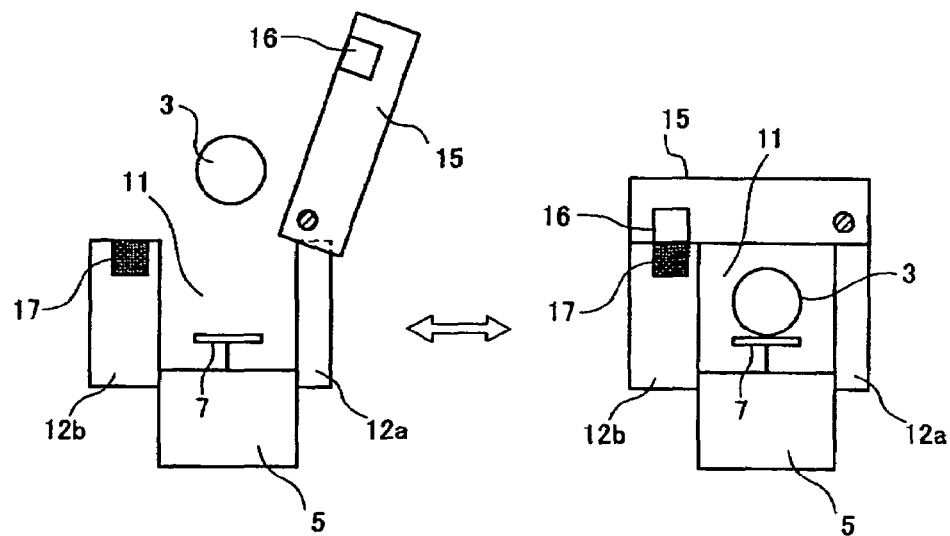
FIG. 3 is a schematic drawing illustrating a detecting section that magnetically detects a fusion spliced portion within the splice protection heater using the operation of a heater cover enclosing a heating part.
Figure 4:
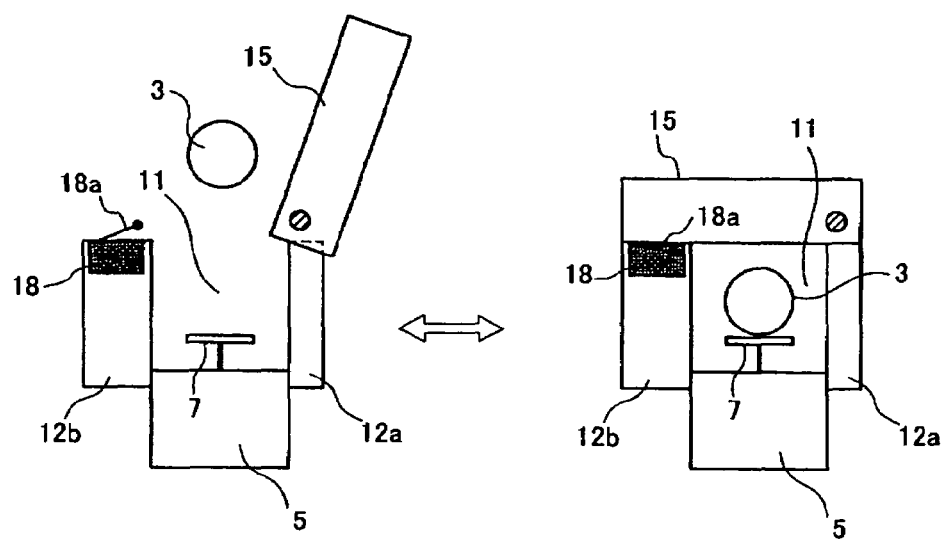
FIG. 4 is a schematic drawing illustrating a detecting section that mechanically detects a fusion spliced portion within the splice protection heater by a micro switch using the operation of the heater cover enclosing the heating part.
Figure 5:
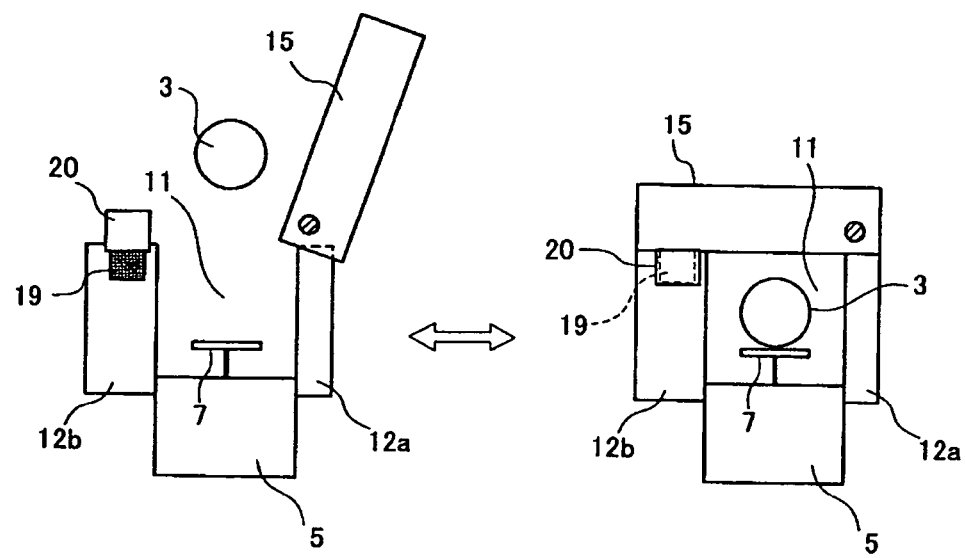
FIG. 5 is a schematic drawing illustrating a detecting section that optically detects a fusion spliced portion within the splice protection heater using the operation of the heater cover enclosing the heating part.

FIGS. 3~5 are schematic diagrams illustrating the detecting section that detect the fusion spliced portion within the splice protection heater using the opening and closing of the heater cover that encloses the heating part, and FIG. 3 shows an example of magnetic detection. A magnet 16 is embedded in a heater cover 15 that is hinged on the sidewall 12a side and is operated so as to enclose the heating part, and a magnetic sensor 17 is embedded in the sidewall 12b side. For example, a magnetic resistance element, a hall element, a lead switch, and the like may be used as the magnetic sensor 17. When the fusion spliced portion 2 covered with the protection sleeve 3 is set on the heating element 7 in the housing 11 and the heater cover 15 is closed, the magnetic sensor 17 detects the proximity of the magnet 16, and the switch of the heating element 7 is automatically turned ON to allow the current to start flowing. When the heater cover 15 is opened to remove the fusion-spliced portion 2 from the housing 11, the switch of the heating element 7 is automatically turned OFF to stop the current flow.

FIG. 4 shows an example of mechanical detection by a micro switch. A micro switch 18, which operates when the heater cover 15 is opened or closed, is installed on the sidewall 12b. When the heater cover 15 is closed, the heater cover 15 presses against a switch lever 18a of the micro switch 18, and the switch of the heating element 7 is automatically turned ON to allow current to start to flow. When the heater cover 15 is opened, the pressure on the switch lever 18a of the micro switch 18 is released and the switch of the heating element 7 is automatically turned OFF to stop the current flow.

FIG. 5 shows an example of optical detection. An optical sensor 19 having a light-emitting element and a photoreceptor element, and a light shutter member 20 are provided on the sidewall 12b side (details of the optical sensor 19 are described later with reference to FIG. 10). When the heater cover 15 is closed, the heater cover 15 depresses the light shutter member 20 and the shutter member 20 is disposed between the light-emitting element and the photoreceptor element of the optical sensor 19, thereby actuating the optical sensor 19, and the switch of the heating element 7 is automatically turned ON to start the current flow. When the heater cover 15 is opened, the depression of the light shutter member 20 is released; the switch of the heating element 7 is automatically turned OFF to stop the current flow.

A mistake caused by forgetting to turn the switch ON or OFF can be reliably prevented, because, as shown in the examples of FIGS. 3~5, the switch of the heating element 7 is automatically turned ON and OFF by the operation of the heater cover 15 when the fusion spliced portion 2 covered with the protection sleeve 3 is set in the splice protection heater. Furthermore, since the heating by the heating element is performed when the protection sleeve 3 is set in the heating part, the heating time and heating environment are uniform, and an uniform quality fusion process is performed. Moreover, the switch may be turned OFF using a timer to accurately measure the heating time.

Figure 6:
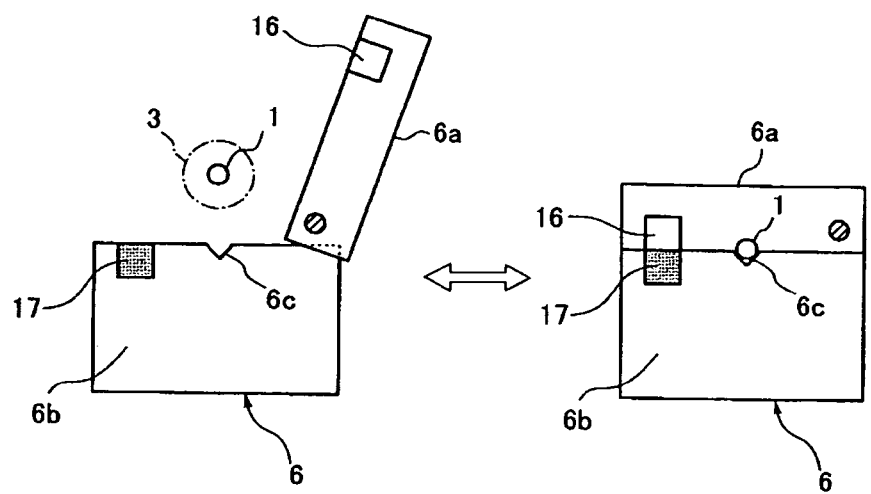
FIG. 6 is a schematic drawing illustrating a detecting section that magnetically detects a fusion spliced portion within the splice protection heater using the operation of a clamper.
Figure 7:
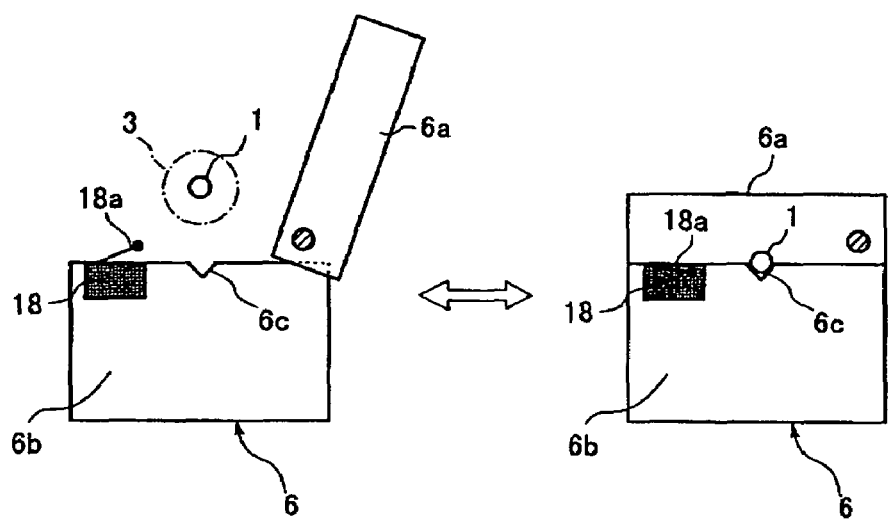
FIG. 7 is a schematic drawing illustrating a detecting section that mechanically detects a fusion spliced portion within the splice protection heater by a micro switch using the operation of the clamper.
Figure 8:
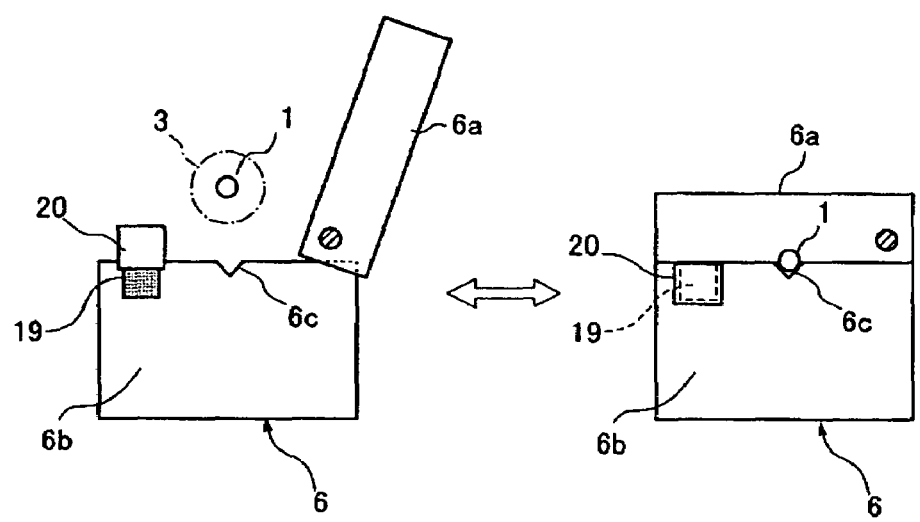
FIG. 8 is a schematic drawing illustrating a detecting section that optically detects a fusion spliced portion within the splice protection heater using the operation of the clamper.

FIGS. 6~8 are schematic diagrams illustrating the detecting section that detects the fusion-spliced portion 2 in the splice protection heater by the operation of the clamper 6, and FIG. 6 shows an example of mechanical detection. The clamper 6 has a pressing member 6a connected to an openable and closable hinge, and a clamp base 6b provided with a V-channel 6c for gripping the optical fiber 1 at a predetermined position. The magnet 16 is embedded in the pressing member 6a side, and the magnetic sensor 17 is embedded in the clamp base 6b side. For example, a magnetic resistance switch, a hall element, a lead switch, and the like may be used as the magnetic sensor 17. When the pressing member 6a is closed, the magnetic sensor 17 detects the proximity of the magnet 16, and the switch of the heating element 7 is automatically turned ON to start the current flow. When the pressing member 6a is opened, the switch of the heating element 7 is automatically turned OFF to stop the current flow.

FIG. 7 shows an example of mechanical detection by a micro switch. The micro switch 18 is provided on the clamp base side 6b and is actuated by the operation of the pressing member 6a. When the pressing member 6a is closed, the pressing member 6a presses against the switch lever 18a of the micro switch 18, and the switch of the heating element 7 is automatically turned ON to start the current flow. When the pressing member 6a is opened, the pressure on the switch lever 18a of the micro switch 18 is released, and the switch of the heating element 7 is automatically turned OFF to stop the current flow.

FIG. 8 shows an example of optical detection. The optical sensor 19 having a light-emitting element and a photoreceptor element, and the light shutter member 20 are provided on the clamp base 6b side. When the pressing member 6a is closed, the pressing member 6a depresses the light shutter member 20 and actuates the optical sensor 19, and the switch of the heating element 7 is automatically turned ON to start the current flow. When the pressing lever 6a is opened, the depression of the light shutter member 20 is released, and the switch of the heating element 7 is automatically turned OFF to stop the current flow.

A mistake caused by forgetting to turn the switch ON or OFF can be reliably prevented, because, as shown in the examples of FIGS. 6~8, the switch of the heating element 7 is automatically turned ON or OFF by the operation of the pressing member 6a of the clamper 6 when a fusion spliced portion 2 covered with a protection sleeve 3 is set in the splice protection heater. The switch may be turned OFF using a timer to accurately measure the heating time. Furthermore, by providing the detecting section that detects a change of the position of the optical fiber on the clamper, which is separated from the heating part and unlikely to be influenced by the heat, there is scant wear and greater stability in the operating state.

Figure 9:
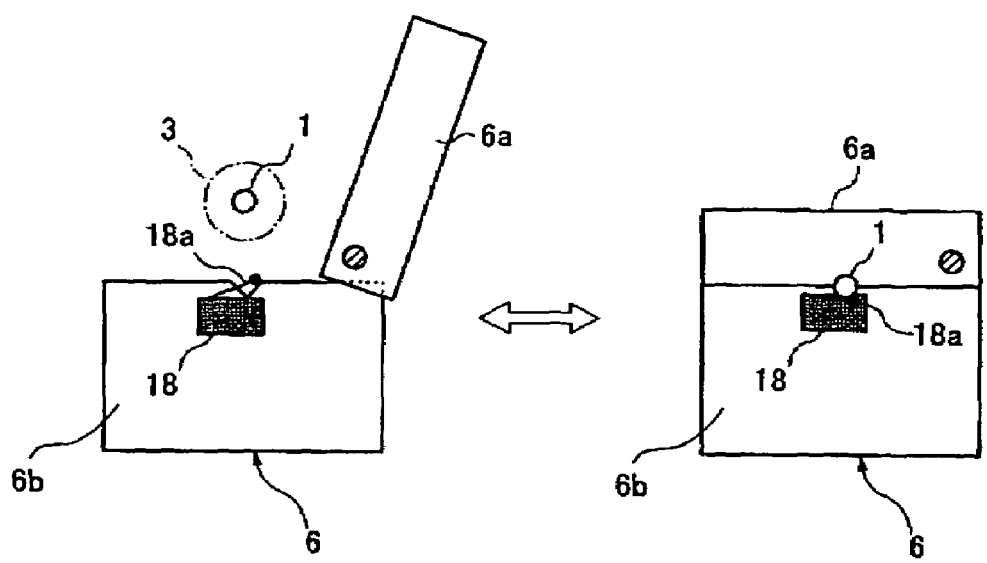
FIG. 9 is a schematic drawing illustrating a detecting section that mechanically detects a fusion spliced portion within the splice protection heater by a micro switch by detecting an optical fiber itself.

FIGS. 9 and 10 are schematic diagrams illustrating the detecting section that detects the fusion-spliced portion within the splice protection heater by detecting the optical fiber itself, and FIG. 9 shows an example of mechanical detection by the micro switch. The switch lever 18a of the micro switch 18 disposed near the clamper 6 is directly actuated by placing the optical fiber 1. When the pressing member 6a is closed, the optical fiber 1 presses against the switch lever 18a of the micro switch 18, and the switch of the heating element 7 is automatically turned ON to start the flow of current. A sufficient actuation force is generated to actuate the micro switch 18 by the tightly stretched optical fiber 1. When the pressing member 6a is opened to remove the fusion spliced portion 2 from the heating element, the pressure is released on the switch lever 18a of the micro switch 18, and the switch of the heating element 7 is automatically turned OFF to stop the flow of current.

Figure 10A:
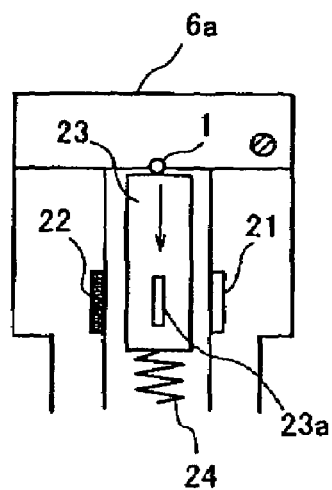
FIGS. 10A and 10B are schematic drawings illustrating a detecting section that optically detects a fusion spliced portion within the splice protection heater by detecting an optical fiber itself, where
Figure 10B:
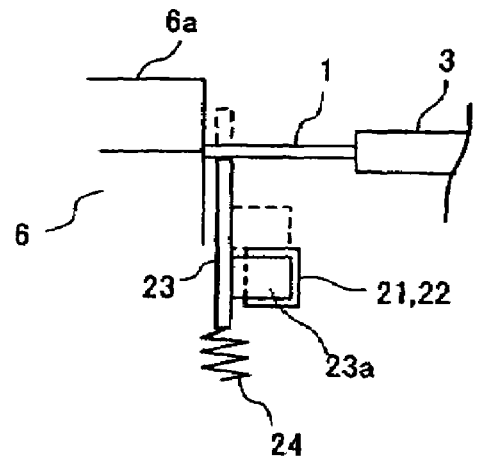

FIGS. 10A and 10B are schematic drawings illustrating a detecting section that optically detects a fusion spliced portion within the splice protection heater by detecting an optical fiber itself, where FIG. 10A illustrates a view on a plane taken in a direction substantially perpendicular to the optical fiber and FIG. 10B illustrates a view on a plane taken in a direction substantially parallel to the optical fiber. An optical sensor is disposed near the clamper 6. The optical sensor has an actuation member 23 that is biased upward by a force-exerting member 24, such as a spring or the like, and when the optical fiber 1 is placed, an actuation member 23 is depressed. The optical sensor having a light-emitting element 21 and a photoreceptor element 22 is shielded by the optical shutter 23a, which is provided on the actuation member 23, such that the photoreceptor element 22 does not receive light and the placement of the fusion spliced portion 2 is detected whereupon the heating element 7 is automatically turned ON to start the current flow. When the fusion-spliced portion 2 is removed from the heating element, the optical shutter 23a returns to the higher position and the switch of the heating element 7 is automatically turned OFF to stop the current flow. Since the optical fiber 1 is extremely fine, it is difficult for the optical fiber itself to block the light emitted by the light-emitting element. However, the change of position of the optical fiber 1 can be directly detected using the above construction.

As shown in the examples of FIGS. 9, 10A, and 10B, forgetting to turn the switch ON and OFF is reliably prevented because the switch of the heating element 7 is automatically turned ON and OFF by the presence/absence of the optical fiber 1. Furthermore, since the heating by the heating element is performed when the fusion-spliced portion 2 is set at a predetermined position of the heating part, the heating time is uniform, and a uniform quality fusion process is performed. Moreover, the switch may be turned OFF using a timer to accurately measure the heating time. Less wear and more stable operation can be obtained since the detecting section that detects a change of position of the optical fiber can be provided near the clamper so as to be separated from the heating part and not influenced by the heat emanating therefrom.

Figure 11:
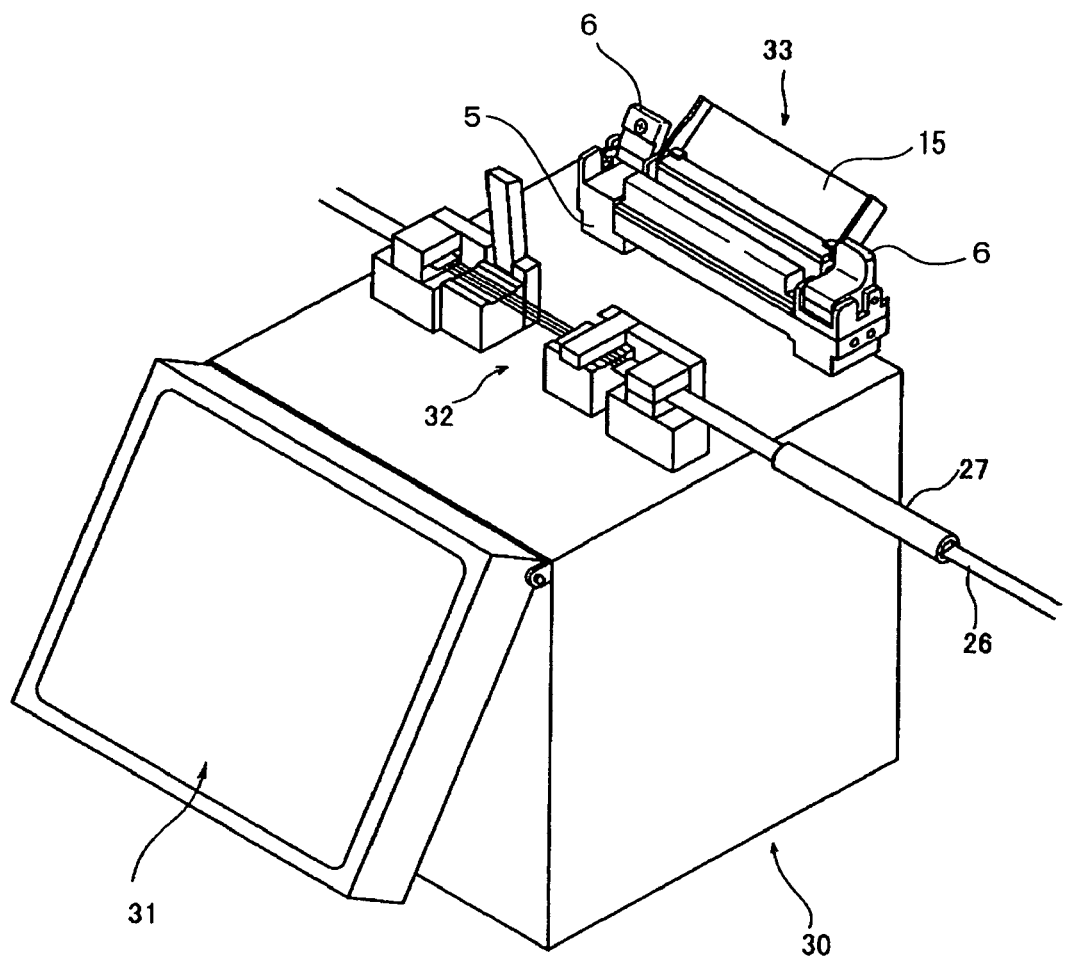
FIG. 11 is a schematic drawing showing a fusion splicer provided with the splice protection heater according to the first embodiment of the present invention.

FIG. 11 is a schematic diagram illustrating a fusion splicer provided with the splice protection heater of the first embodiment. A fusion splicing mechanism 32 can perform a single fiber fusion splice or ribbon fiber fusion splice by arc discharge, and the fusion state is monitored by a monitoring device 31. Since the fusion splicing mechanism 32 is well known in the art, the structure will not be discussed or illustrated in detail herein. FIG. 11 shows an example of a batch fusion splicing of a fiber ribbon 26. When the optical fiber is fusion spliced, a protection sleeve 27 is attached beforehand to either side of the optical fiber ribbon, and moved so as to cover the fusion-spliced portion after fusion splicing. A fusion splicer 30 can efficiently performs consecutive operations of fusion and protection by disposing the splice protection heater 33 of the first embodiment parallel to the fusion splicing mechanism 32.

After the optical fiber ribbons 26 has been abutted with each other and fusion spliced by the fusion splicing mechanism 32, the fusion spliced portion is covered with the protection sleeve 27 and set in the heating part of the adjacently disposed splice protection heater 33. The placement of the protection sleeve 27 at the predetermined position in the splice protection heater 33 automatically turns ON the switch of the heating element, thus preventing the operator from forgetting to turn on the switch and efficiently performing the fusion process for a predetermined heating time. The switch is turned OFF when the protection sleeve 27 is removed, thus preventing the operator from forgetting to turn OFF the switch.

Since the thermal protection process requires a longer time than the time necessary for fusion splicing, an idle time for waiting the thermal protection process may be caused after the fusion splicing. A fusion spliced optical fiber that has not been subjected to the fiber protection process is susceptible to fracture and can be easily damaged, because it is mechanically weak. To prevent such case, it is preferable to provide a plurality of splice protection heaters 33 to eliminate the idle time for the thermal protection process for a plurality of fusion-spliced optical fibers.

Figure 12:
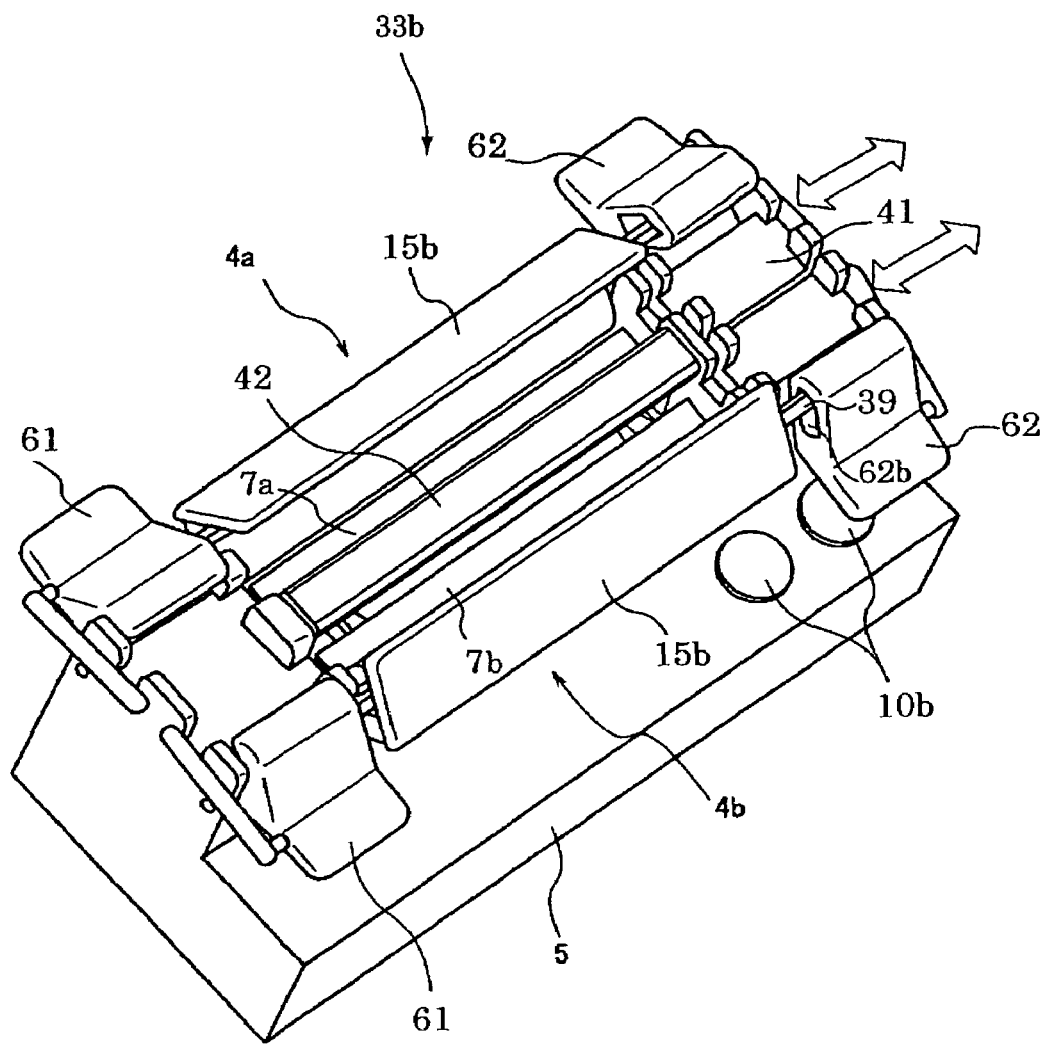
FIG. 12 is a perspective view of a splice protection heater according to a second embodiment of the present invention.
Figure 13:
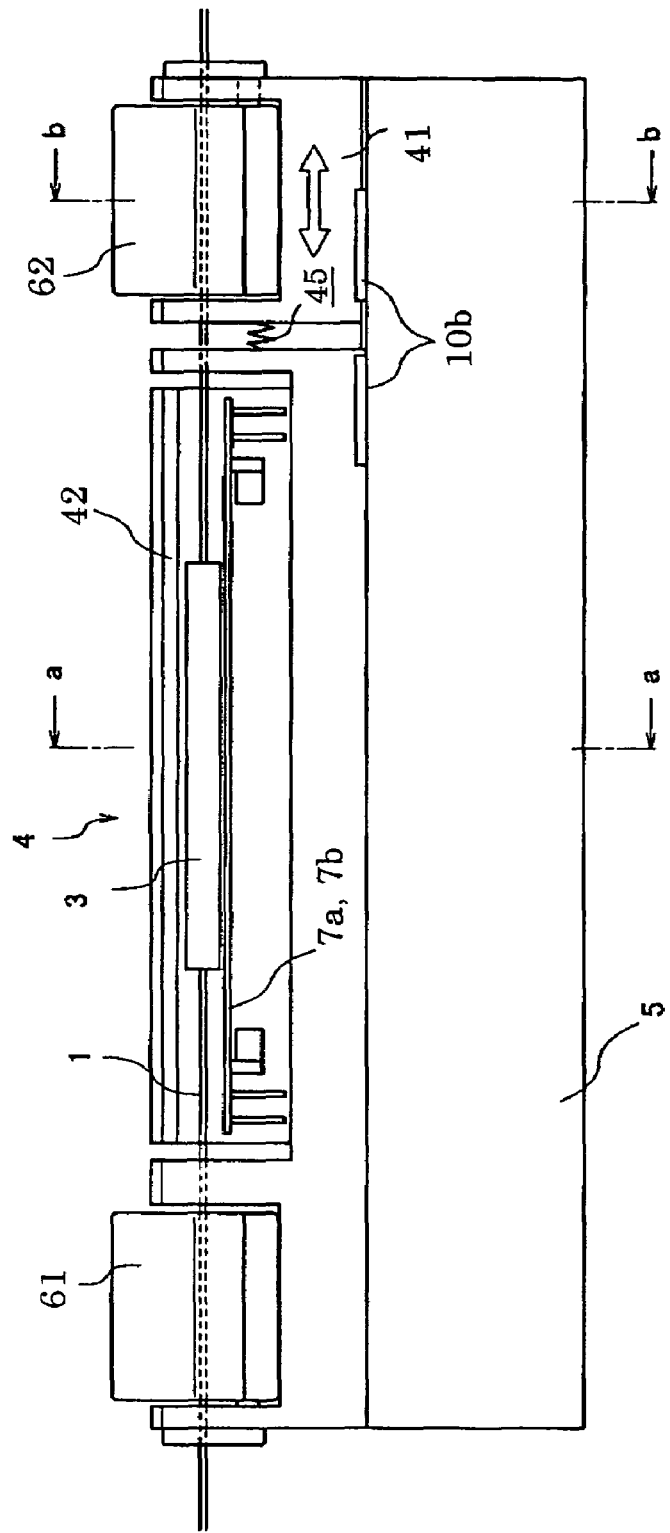
FIG. 13 is a front view of the splice protection heater according to the second embodiment of the present invention with a heater cover removed.
Figure 14:
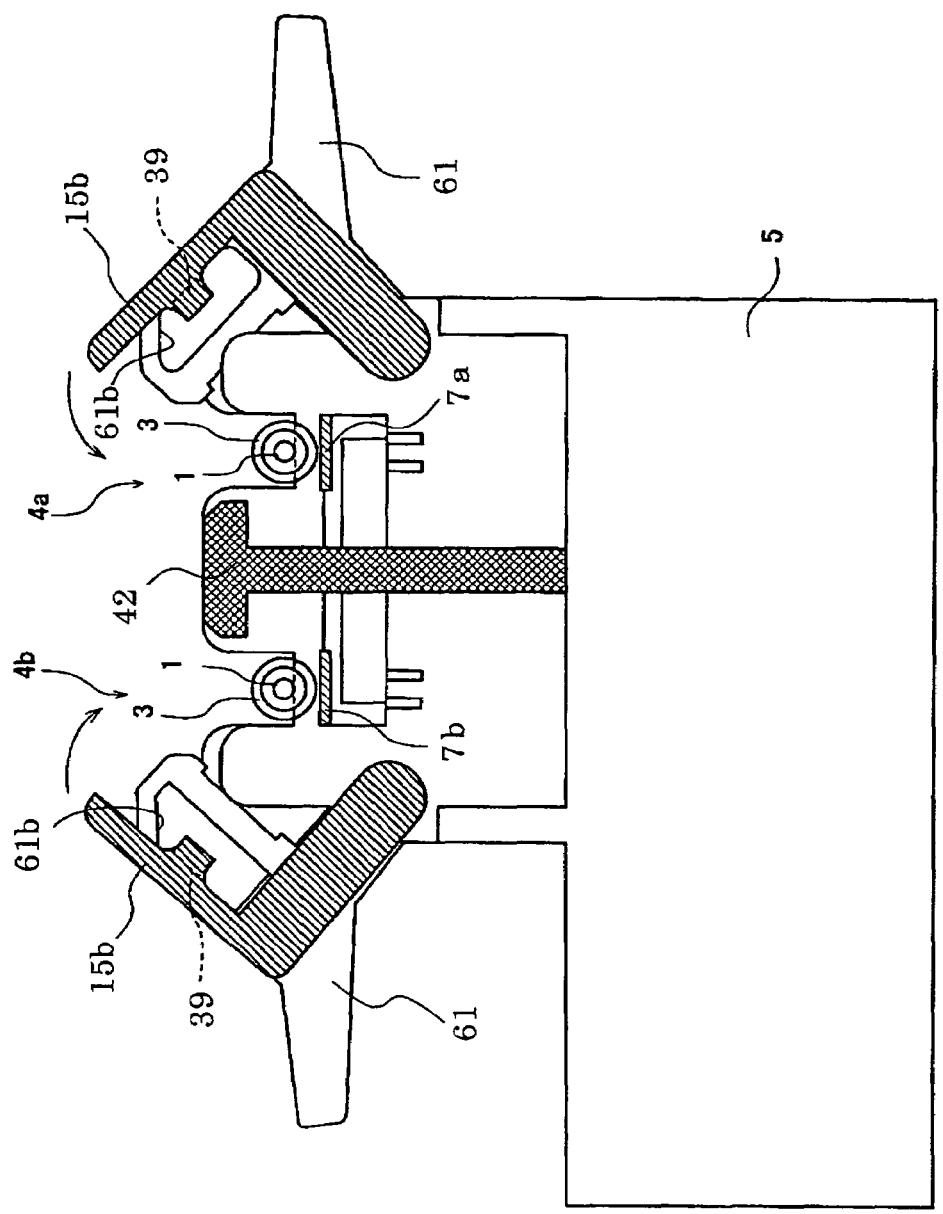
FIG. 14 is a cross sectional view of the splice protection heater taken along a section line a-a of FIG. 13 with the clamper and heater cover opened.
Figure 15:
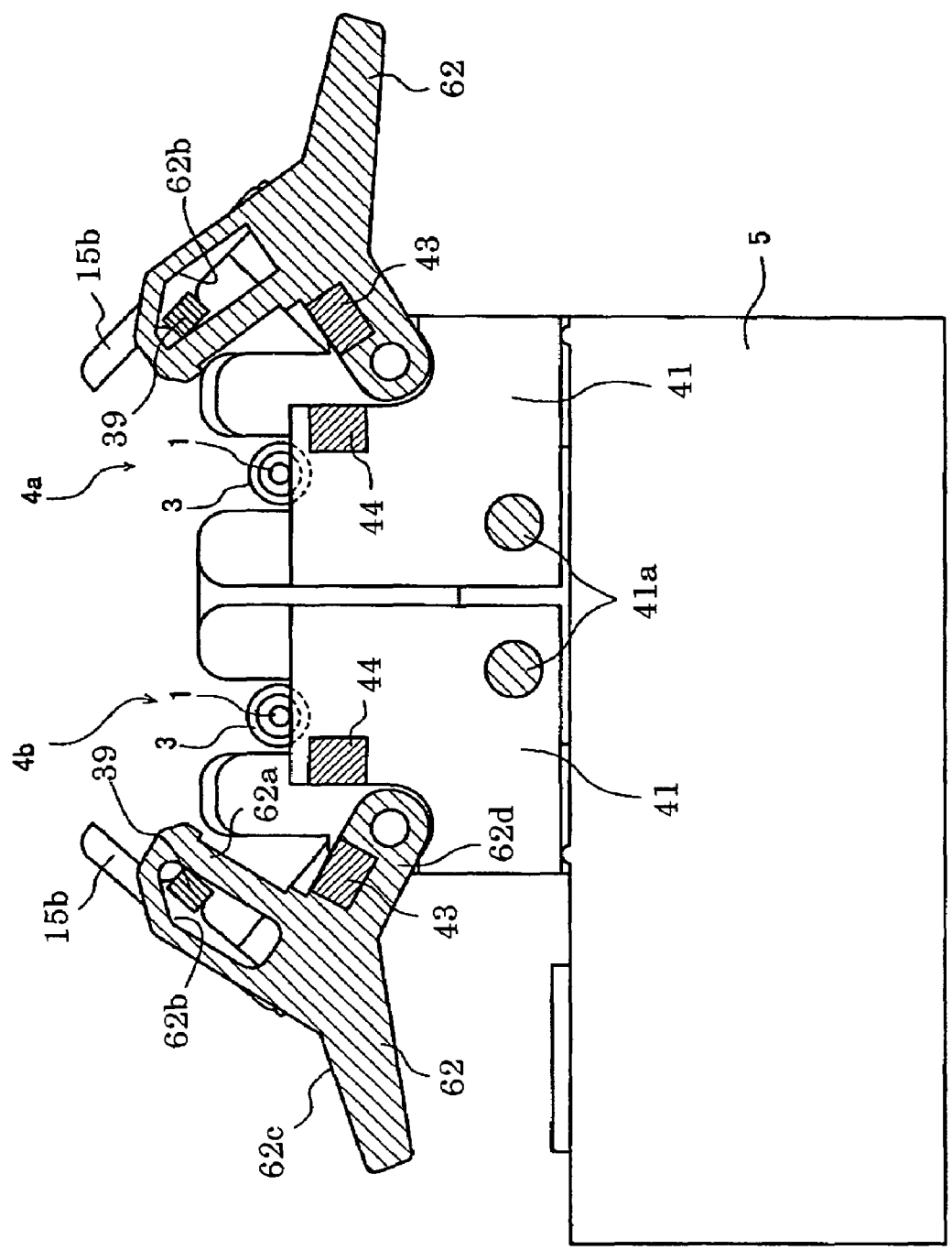
FIG. 15 is a cross sectional view of the splice protection heater taken along a section line b-b of FIG. 13 with the clamper and heater cover opened.

FIGS. 12~15 are schematic diagrams illustrating a splice protection heater according to a second embodiment of the present invention. FIG. 12 is a perspective view, FIG. 13 is a front view with the heater cover removed, FIG. 14 is a cross sectional view taken along a section line a-a of FIG. 13 with the clamper and heater cover opened, and FIG. 15 is a cross sectional view taken along a section line b-b of FIG. 13 with the clamper and heater cover opened, also. As shown in FIG. 12, the splice protection heater 33b is provided with at least two heating unit 4a and 4b as a heating part 4 on a base 5, such that heating elements 7a and 7b, which can be turned ON and OFF by independent switches, are respectively disposed in each heater 4a and 4b. FIG. 12 shows a state in which the optical fiber 1 and the protection sleeve 3 have not attached to the splice protection heater.

Each of the heating unit 4a and 4b has a housing part to accommodate the protection sleeve 3, and each of the heating unit 4a and 4b is provided with a pair of clampers 61 and 62 for fixedly gripping the optical fiber 1 extending from bilateral ends of the protection sleeve 3. A tension exerting mechanism 41 is provided on the right side clamper 62 to operate in conjunction therewith. Each of the heating unit 4a and 4b is provided with a heater cover 15b that covers the protection sleeve 3. A heat-shielding member 42 is disposed between the heating unit 4a and 4b. On the base 5, manual ON/OFF pushbutton switches 10b, for example, may be provided for operating the heating elements 7a and 7b of the heating unit 4a and 4b.

The protection sleeves 3 are set on the heating elements 7a and 7b, and the optical fibers 1 extending bilaterally from the protection sleeves 3 are fixedly gripped by the clampers 61 and 62 (FIG. 13). The two heating unit 4a and 4b are separated by the heat-shielding member 42, such that the respective heating elements 7a and 7b are mutually impervious to adjacent thermal influence (FIG. 14). The protection sleeves 3 are set in the housing part of each of the heating unit 4a and 4b so as to contact the heating elements 7a and 7b. The optical fibers 1 extending from the bilateral ends of the protection sleeves 3 are set on the clamp base (not shown in the drawing) of the clampers 61 and 62.

The heated portion of the protection sleeves 3 are covered with the heater cover 15b during the heating operation so that there will be no heat released externally. The heater cover 15b is provided for each heating element 7a and 7b, and is configured, for example, with a flat or L-shaped cross section so as to be closed to cover a part of the exterior surface of the protection sleeve 3. The heater cover 15b can be installable in a narrow space and can improve operation, if it is configured in two parts, cover sections, in a shape that opens bilaterally in left/right symmetry.

A linkage rod 39 extends from bilateral ends of the heater cover 15b and engages apertures 61b and 62b of the clampers 61 and 62. Accordingly, the heater cover 15b can be closed in linkage with the clamper 61b or 62 by closing either of them. The linkage rod 39 and apertures 61b and 62b are provided with large clearances to allow some slack in operation. The heater cover 15b and the clampers 61 and 62 need not necessarily be linked, and may be operated separately.

The clampers 61 and 62 are preferably provided, as clamper sections, for each heating element so as to be operable independently. The clamper 62 is configured by three legs including a handle 62c, a pressing member 62a, and a shaft support 62d. The aperture 62a for engaging the linkage rod 39 of the heater cover 15b is provided in the pressing member 62a as previously mentioned (FIG. 15). The left side clamper 61 is identically configured as the right side clamper 62. The shaft support 62d can pivot to open, and has an embedded magnet 43. A magnet 44 or other magnetic body is embedded on the clamp base side, such that the closed state is fixedly maintained by magnetic attraction between the magnets 43 and 44.

A tension exerting mechanism 41 may be provided on one of the left and right clampers 61 and 62. The tension exerting mechanism 41 may be realized, as shown in FIG. 13 for example, by forcing clamp base side of the clamper 62 toward the outer side by a force exerting member 45 such as a spring or the like, so as to move along a sliding axis 41a.

In this configuration, the protection sleeve 3 covering the fusion-spliced portion of the optical fiber is placed on the heater 4a or 4b, and the right side of the optical fiber is first gripped by the right side clamper 62. Then, the right side clamper 62 is moved leftward compressing the tension-exerting member 45, and while maintaining this state the left side clamper 61 fixedly grips the left side of the optical fiber 1. Thereafter, the right side clamper 62 is forced rightward when the compression of the tension-exerting member 45 is released, thus drawing the fusion spliced optical fiber tight. By drawing the optical fiber tight, the optical fiber is maintained without bends within the protection sleeve 3, such that the optical fiber is protected in a bendless state when the hot-melt material within the heat-shrunk protection sleeve 3 has been melted and solidified.

It is preferable that the splice protection heater is provided with the heat-shielding member 42 for blocking heat between the heating elements 7a and 7b so as to prevent mutual thermal influence between the respective heating elements 7a and 7b of the heating unit 4a and 4b, and it is preferable that the heat-shielding member 42 is formed of a resin having excellent heat resistance and heat insulation. It is further preferable that the shape of the heat-shielding member 42 is such as to enclose the protection sleeve 3 to block heat from the heating element 7a and 7b from being released to the outside when the heater cover 15b is closed.

As described above, by providing at least two heating units each having a tension exerting mechanism, independently openable/closeable cover section and clamper section, and heating element that can be turned ON and OFF with a different timing by independent switch respectively, the optical fiber can be covered with a protection sleeve and performed with the thermal protection process immediately after the fusion splicing has been completed without causing an idle time. Thus, the fusion spliced portion and it's neighboring portion, which are unprotected, of the optical fiber can be prevented from breakage or damage and the overall work time can be shortened.

Figure 16:
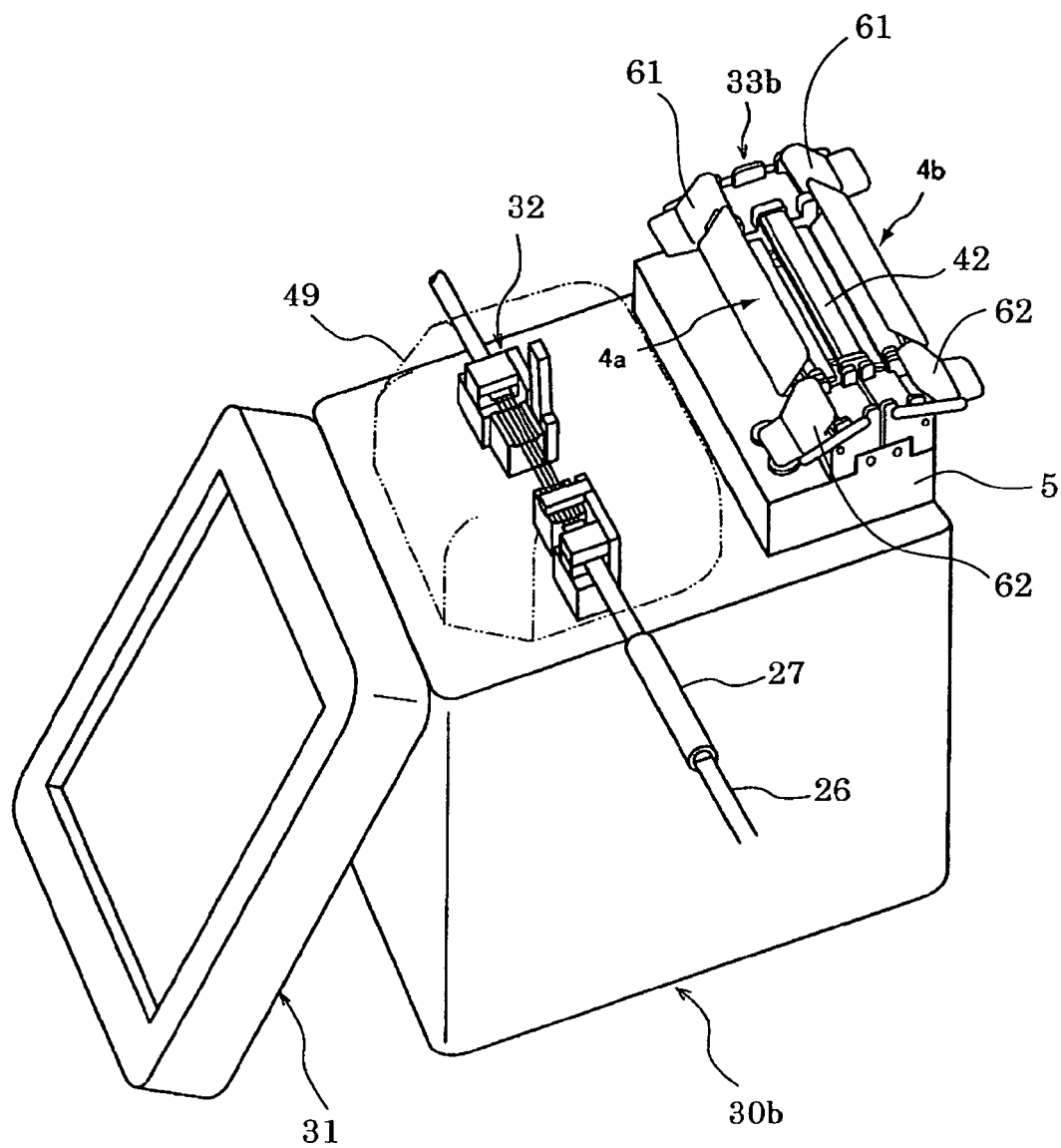
FIG. 16 is a schematic drawing showing a fusion splicer provided with the splice protection heater according to the second embodiment of the present invention.

FIG. 16 is a schematic diagram showing a fusion splicer provided with the splice protection heater of the second embodiment. The fusion splicing mechanism 32 is identical to that of the first embodiment. The fusion splicing mechanism 32 is covered with a hood 49 to prevent the heat discharged during fusion splicing from affecting the outside.

The optical fiber ribbons 26 are placed in the fusion splicing mechanism 32 and fusion spliced, then the fusion spliced portion is covered with the protection sleeve 27, and is placed on either heater 4a or 4b of the adjacent splice protection heater 33b. Heating is started by a heating element that can be individually turned ON and OFF, and new optical fibers to be fusion spliced are set on the empty fusion splicing mechanism 32.

Although the protection process for the previously fusion spliced optical fiber is underway in the splice protection heater 33b even after the new optical fiber fusion splice has been completed, a protection process for the new fusion spliced-optical fiber can be performed in the empty heater. That is, heating processes of a plurality of protection sleeves can be performed by staggering heating starting times. Thereafter, the cycle is repeated. The time waiting for performing the thermal protection process is reduced to zero by adding heating units 4a and 4b with independent heat controls according to the time required for the fusion splicing and for the protection process.

Figure 17:
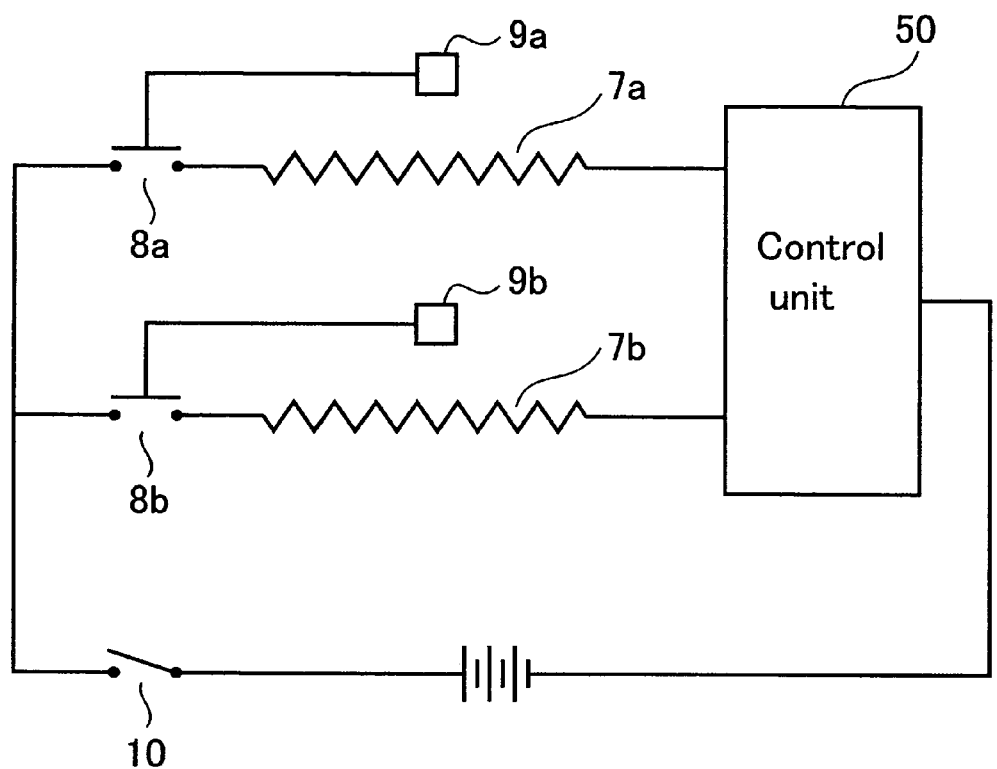
FIG. 17 is a schematic drawing of an electrical circuit in the splice protection heater according to the second embodiment of the present invention.

FIG. 17 is a schematic drawing showing an electrical circuit in the splice protection heater of the second embodiment. The splice protection heater of the second embodiment has two sets of the heating element 7, the switch 8 and the detecting section 9 of the first embodiment (illustrated in FIG. 17 as the heating elements 7a and 7b, the switches 8a and 8b and the detecting section 9a and 9b). In addition, a single control unit 50 is provided to batch control current supplied to the heating elements 7a and 7b.

Figure 18A:
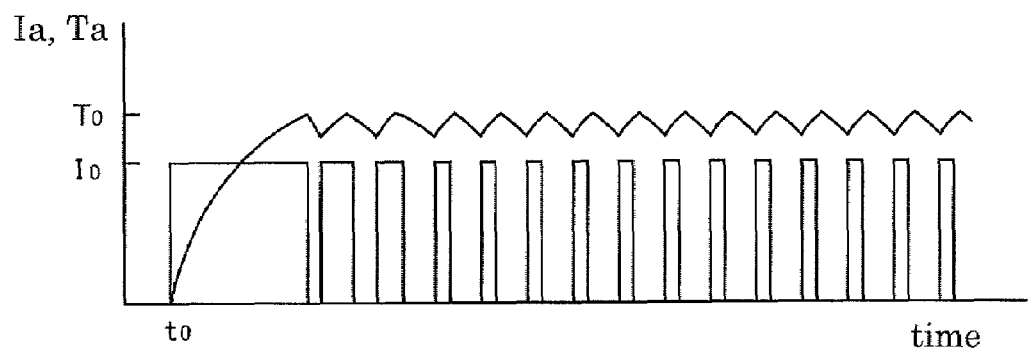
FIGS. 18A and 18B are graphs showing examples of current and heating part temperature controlled by a control unit of the splice protection heater according to the second embodiment of the present invention.
Figure 18B:
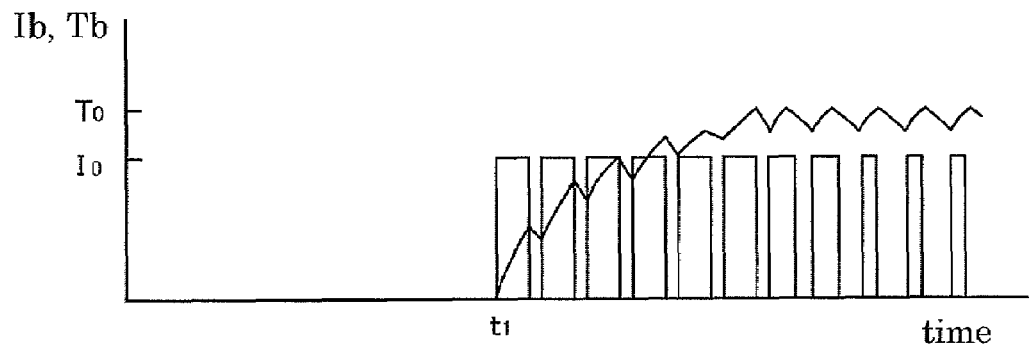

FIGS. 18A and 18B are graphs showing examples of the current controlled by the control unit 50 and the temperatures of the heating parts.

FIG. 18A shows the current Ia supplied to the heating element 7a, and the temperature Ta of the heating element 7a, and FIG. 18B shows the current Ib supplied to the heating element 7b, and the temperature Tb of the heating element 7b. At time $t_0$ the switch 8a is turned ON when a fusion splice portion is set on the heater 4a, and a current $I_0$ is supplied to the heating element 7a. The control unit 50 measures the temperature Ta of the heating element 7a by monitoring the resistance of the heating element 7a, and switches ON/OFF the current Ia supplied to the heating element 7a so as to maintain the heating element 7a at the temperature $T_0$.

At time $t_1$, the switch 8b is turned ON when a fusion splice portion is placed on the heater 4b, and the current $I_0$ is also supplied to the heating element 7b. The control unit 50 measures the temperature Tb of the heating element 7b by monitoring the resistance of the heating element 7b, and turns ON/OFF the current Ib supplied to the heating element 7a so as to maintain the heating element 7b at a temperature $T_0$. Thus, current is controlled so as to not be supplied simultaneously to the heating element 7a and heating element 7b.

Since the control unit 50 controls the current so as to not be supplied simultaneously to the heating elements 7a and 7b, the maximum current supplied via a battery is restricted to the same current $I_0$ as in the case of a single splice protection heater (for example, 2.6 A). Thus, battery depletion is suppressed, and the number of battery recharges and discharges can be increased from 400 to 500 times.

While this invention has been described in connection with what is presently considered to be the most practical and preferred embodiments, the invention is not limited to the disclosed embodiments, but on the contrary, is intended to cover various modifications and equivalent arrangements included within the spirit and scope of the appended claims.

The entire disclosures of Japanese Patent Application No. 2005-168965 filed on Jun. 9, 2005 and Japanese Patent Application No. 2005-201446 filed on Jul. 11, 2005 including specification, claims, drawings, and summary are incorporated herein by reference in its entirety.

What is claimed is:

1. A splice protection heater comprising:
   a heating part configured and arranged to heat shrink a plurality of protection sleeves that covers a corresponding plurality of fusion spliced portions of corresponding optical fibers, the heating part including:
      a plurality of heating elements separated by at least one heat-shielding member, the plurality of heating elements being configured and arranged to separately heat the plurality of protection sleeves with different timing,
      a plurality of independent switches connected to corresponding ones of the plurality of heating elements,
      a heater cover that is openable and closable around a heat generating portion of the plurality of heating elements, and
      clampers configured and arranged to grip individual ones of the optical fibers at bilateral ends of the plurality of heating elements.

2. The splice protection heater as recited in claim 1, wherein
   the heater cover includes a plurality of cover sections configured and arranged to be individually openable and closable around corresponding one of the heating elements.

3. The splice protection heater as recited in claim 1, wherein
   each of the clampers includes a plurality of clamper sections configured and arranged to individually grip a corresponding one of the optical fibers disposed on a corresponding one of the heating elements.

4. The splice protection heater as recited in claim 3, wherein
   each of the plurality of clamper sections is provided with a tension exerting mechanism configured and arranged to exert a tension force on a corresponding one of the optical fibers.

5. The splice protection heater as recited in claim 1, further comprising
   a plurality of micro switches configured and arranged to detect whether or not the plurality of protection sleeves are placed on corresponding ones of the plurality of heating elements by mechanically detecting corresponding ones of the optical fibers, and to turn ON or OFF the corresponding switches.

6. The splice protection heater as recited in claim 1, further comprising
   a single control unit configured to batch control currents supplied to the plurality of heating elements.

7. A fusion splicer including the splice protection heater as recited in claim 1.

8. An optical fiber fusion splicing method comprising:
   fusion splicing a first optical fiber;
   fusion splicing a second optical fiber;
   covering the fusion spliced portion of the first optical fiber with a first protective sleeve;
   covering the fusion spliced portion of the second optical fiber with a second protection sleeve;
   positioning the first protective sleeve and the first optical fiber on a first heater of a splice protection heater;
   positioning the second protective sleeve and the second optical fiber on a second heater of the splice protection heater;
   turning on the first heater of the splice protection heater at a first timing to start heat shrinking of the first protection sleeve; and
   turning on the second heater of the splice protection heater at a second timing to start heat shrinking of the second protection sleeve.

9. A splice protection heater comprising:
   a heating part configured and arranged to heat shrink a protection sleeve that covers a fusion spliced portion of an optical fiber, the heating part including:
   a housing;
   a heating element disposed within the housing configured and arranged to be selectively turned ON or OFF by a switch;
   a heater cover supported to the housing that is openable and closable around a heat generating portion of the heating element;
   clampers supported to the housing configured and arranged to grip the optical fiber at bilateral ends of the heating element;
   a detecting section disposed to the housing proximate the heating element configured and arranged to detect whether or not the protection sleeve is placed on the heating element; and
   an automatic switch section configured to turn the switch ON in response to detection by the detecting section of the protection sleeve being placed on the heating element and further configured to remain OFF in response to the protection sleeve not being placed on the heating element.

10. The splice protection heater as recited in claim 9, wherein
    the detecting section includes a sensor that is configured and arranged to optically detect whether the protective sleeve is placed on the heating element.

11. The splice protection heater as recited in claim 9, wherein
    the detecting section includes a sensor that is configured and arranged to magnetically detect whether the protective sleeve is placed on the heating element.

12. A fusion splicer including the splice protection heater as recited in claim 9.

13. An optical fiber fusion splicing method comprising:
    fusion splicing an optical fiber;
    covering a fusion-spliced portion of the optical fiber with a protection sleeve;

positioning the fusion-spliced portion of the optical fiber and protective sleeve in a housing having a splice protection heater;

detecting whether the protection sleeve is placed on a heating element of the splice protection heater; and automatically turning ON a switch of the heating element upon detection of the protection sleeve being placed on the heating element to start heat shrinking the protection sleeve.

14. The splice protection heater as recited in claim 10, wherein
the sensor includes a light emitting element disposed within the housing on a first side of the heating element and a photoreceptor element disposed within the housing on a second side of the heating element opposite the light emitting element.

15. The splice protection heater as recited in claim 11, wherein
the sensor includes a magnetic resistance element and a Hall effect element disposed within the housing on opposite side of the heating element.

* * * * *